UNITED STATES PATENT OFFICE.

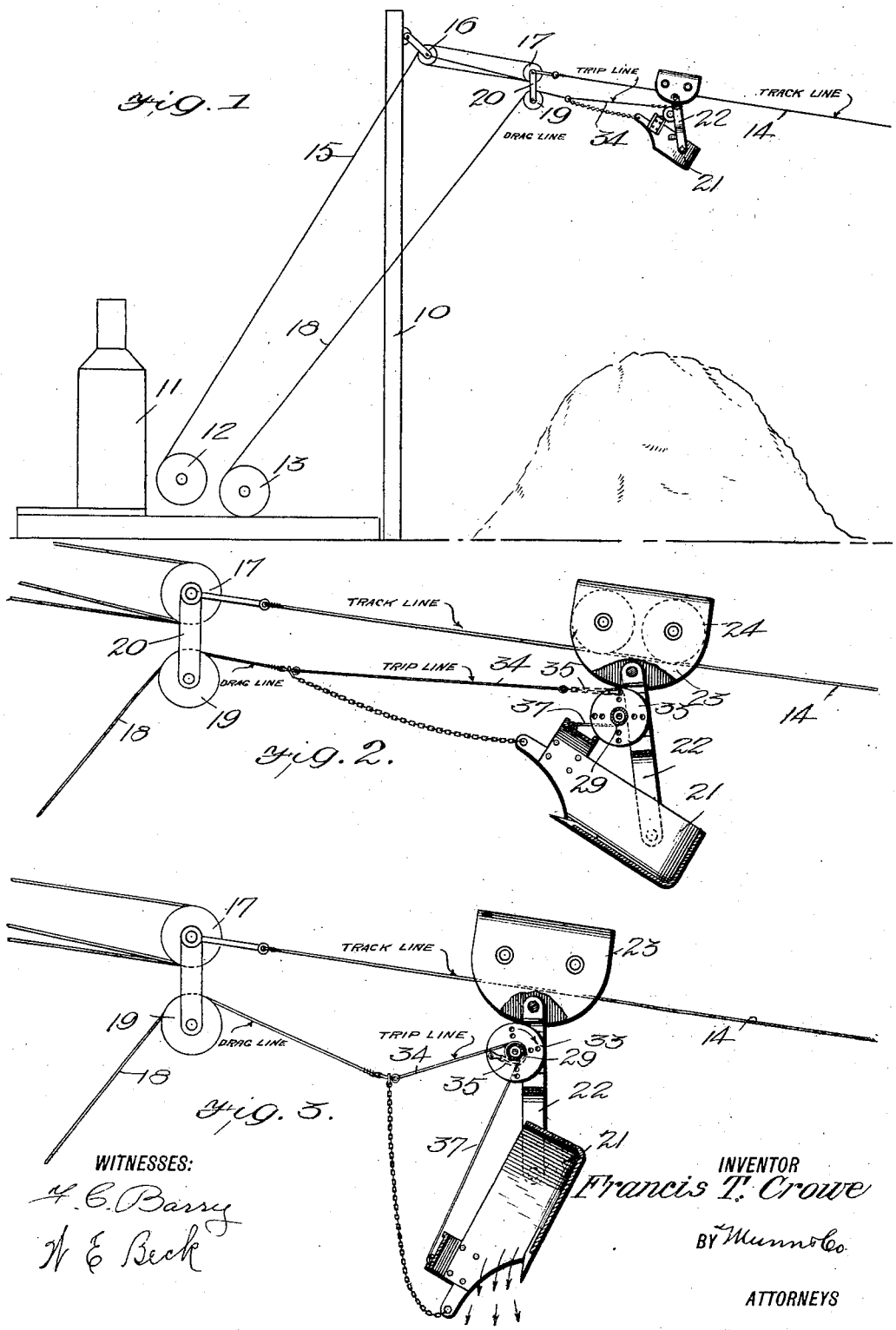

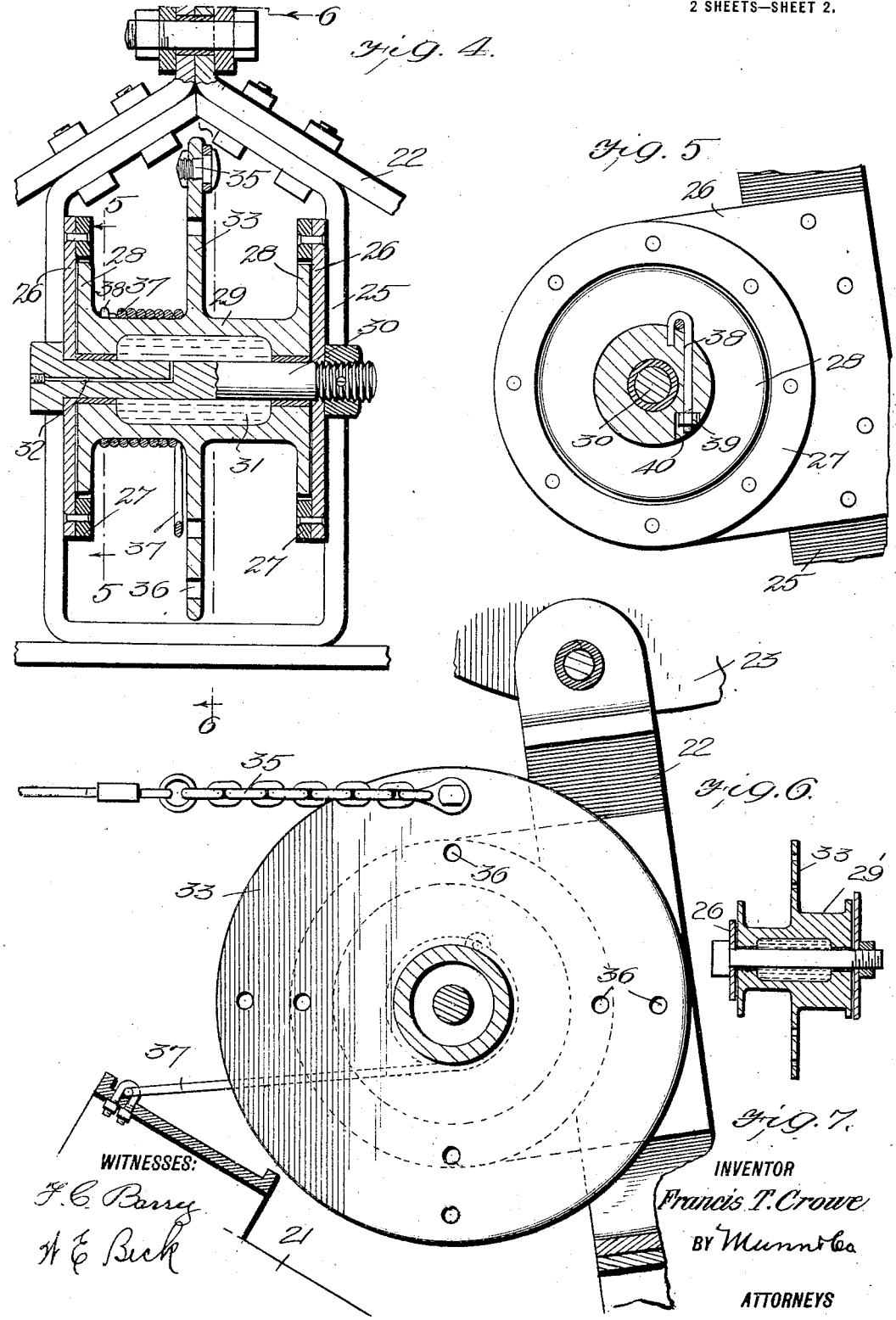

FRANCIS TRENHOLM CROWE, OF MORAN, WYOMING.

DUMPING DEVICE FOR EXCAVATING-BUCKETS.

1,234,734. Specification of Letters Patent. Patented July 31, 1917.

Application filed December 7, 1915. Serial No. 65,505.

*To all whom it may concern:*

Be it known that I, FRANCIS T. CROWE, a citizen of the United States, and a resident of Moran, in the county of Lincoln and State of Wyoming, have invented an Improvement in Dumping Devices for Excavating-Buckets, of which the following is a specification.

This invention is an improvement in excavating apparatus and has particular reference to a mechanism for operating the buckets to load and unload the same.

Briefly stated, the invention contemplates providing an excavating bucket adapted for support on the cableway or swing crane and having a drum associated therewith and provided with a central disk to which is adjustably connected one end of a trip line the other end of which is attached to the usual drag line employed in apparatus of this nature. The holding line has one end connected to the bucket and is adapted to be wound upon the drum on one side of said disk when the bucket is in loaded position, the tension or purchase on the drag line, transmitted through the trip line to said drum, being sufficient to overcome the tendency of the load in the bucket to dump the same until such time when said tension is slackened or released, whereupon the holding line will unwind from the drum and the trip line wind thereupon on the opposite side of said disk thus unloading the bucket.

An object of the invention is the provision of an apparatus of this kind which is simple in construction, easy to manufacture, effective in carrying out the purpose for which it is designed, and which may be applied to different known constructions of excavating buckets.

The inventive idea involved is capable of receiving a variety of mechanical expressions, one of which, for the purpose of illustrating the invention, is shown in the accompanying drawings, in which—

Figure 1 is a diagrammatic illustration of an excavating apparatus showing the invention applied thereto.

Fig. 2 is a view of a portion of the apparatus, partially in section and showing the bucket in loaded position.

Fig. 3 is a view similar to Fig. 2 showing the bucket in unloaded or dumping position.

Fig. 4 is a sectional view of the drum employed in connection with the invention showing the manner of mounting the same in the bail of the bucket.

Fig. 5 is a section on the line 5—5 of Fig. 4.

Fig. 6 is a section on the line 6—6 of Fig. 4.

Fig. 7 is a sectional view of a slight modification of the drum.

The invention is illustrated in connection with a cableway system of excavating apparatus in which the mast 10 is employed adjacent which is mounted the hoisting engine 11 for operating the drums 12 and 13, all diagrammatically illustrated in Fig. 1. One end of a track line or cableway 14 is securely anchored to the ground at a considerable distance from the mast 10 while the other end is connected to a line or cable 15 which is wound upon the drum 12 and which operates over small pulleys 16 and 17 to lift the track line or cableway 14 from a lowered or slackened position assumed when loading the bucket to the position shown in Fig. 1 when said bucket is hoisted to a suitable location for dumping or unloading. The drum 13 has wound thereupon a drag line 18 which passes over a pulley 19 mounted in a hanger 20 which also supports the pulleys 17 and said drag line is connected at its end to the excavating bucket in a manner which will appear in the course of the description.

The excavating bucket 21 may be of any preferred construction and is supported in a bail or hanger 22 which in turn is pivotally mounted in the carriage 23 having track engaging rollers 24 journaled therein and adapted for engagement with the cableway 14. The bail 22 preferably includes a frame 25 having secured thereto and extending laterally therefrom the oppositely disposed plates 26 to the inner faces of which are attached the housing rings 27 which surround the flanged ends 28 of the drum 29.

This drum 29 which comprises one of the essential features of the invention is preferably journaled upon a shaft 30 mounted in the frame 25 extending through the plates 26 adjacent the free ends thereof and is provided with a lubricant containing reservoir 31 which is supplied through the passage 32 extending longitudinally of said shaft. Intermediate the ends of the drum 29 the same has preferably formed thereon a disk 33 of larger diameter than the ends 28 of the drum, said disk dividing the drum into a trip line receiving portion and a holding line receiving portion.

One end of a trip line 34 is connected to the end of the drag line 18 while the other end of said trip line is provided with a small length of chain 35 the extremity of which is adapted to be connected to the central disk 33 by means of a suitable pin or bolt 35 which passes through any one of a plurality of openings 36 formed in said disk. These openings are preferably formed in the disk in radially arranged rows whereby the end of the trip line may be secured at any point on the disk for purposes of adjustment to provide for the use of excavating buckets of different constructions and the loading and unloading of different classes of material. The hub of the drum 29 has fixed thereto, at a point on the opposite side of the disk to which the trip line is secured, one end of a holding or bucket supporting line 37, said end being held in position by means of a hook bolt 38 passing through the hub of the drum and secured in position by means of a nut 39 countersunk in a cavity 40 in said hub. This holding line is, therefore, adapted to be wound upon the drum upon the opposite side of the central disk 33 from that on which the trip line is wound and when the bucket 21 is in loaded position said holding line is wound upon the drum while the trip line is unwound therefrom as shown in Fig. 2. The other end of the holding line 37 is secured to an adjacent part of the bucket 21 whereby to support the same in loaded position.

In practice, when a cableway system is employed, the drag line 14 is first lowered by releasing the drum 12 to pay out the line 15 so that the bucket 21 will be lowered into the ditch or other place to be excavated and the drag line is then caused to be wound upon the drum 13 to drag the bucket and load the same. In loading the bucket and drawing it to the position shown in Fig. 1 sufficient tension is placed upon the drag line 18 to maintain the trip line 34 in its extended or unwound position, shown in Fig. 2, and thus overcome the tendency of the load in the bucket to unwind the holding line 37 from the drum 29. In order to elevate the bucket for dumping the drum 12 is operated to wind the line 15 thereon thus hoisting the track line or cableway 14 up to the position shown in Fig. 1. When the bucket is in the position to be unloaded the tension on the line 18 is slackened until the load in the bucket overcomes the pull on the trip line whereupon the latter will be wound upon the drum 29 and the holding line 37 paid out therefrom until the parts assume the position shown in Fig. 3, whereupon the load will be dumped from the bucket. During the dumping process sufficient tension is maintained on the drag line to retain the bucket 21 and carriage 23 in approximately a stationary position upon the track line 14 so that the material will not be excessively scattered when dumped.

Should it be desired to employ the dumping apparatus in connection with the swinging crane or so called drag line excavator, thus dispensing with the track line or cableway 14, the excavating bucket is connected to a hoisting line carried in any suitable manner by the crane and is also connected to a drag line such as is employed in the drawings, said bucket being dumped in a manner as above described.

When the dumping device is employed on a track line having a slope of more than 14°, it becomes desirable to provide means for retaining the bucket in its dumping position for a sufficient time to permit the contents to be emptied without scattering the same. In other words it is necessary to prevent the bucket from sliding down the track line and for thus purpose the diameter of the holding line portion of the drum is made considerably larger than the opposite portion thereof as shown at 29' in Fig. 7 of the drawings. Such construction will give the holding line sufficient purchase over the trip line when the bucket is in dumping position to overcome the tendency of the trip line, due to tension, to wind the holding line upon the drum until such time when the tension on said trip line is released, as previously described.

What is claimed is:

In an excavating apparatus of the character described, the combination of an excavating bucket, a hanger therefor including a frame, plates extending from said frame, a shaft journaled in said plates, a drum mounted on said shaft and having a central disk provided with rows of radially arranged openings, a trip line having one end secured to one side of said disk adjacent any one of said openings whereby said line may be adjusted, a holding line having one end connected to the bucket and the other end adapted to be wound upon said drum on the side of the disk opposite to that to which the trip line is secured, whereby tension applied to said trip line for retaining said line unwound from said drum will normally retain the holding line wound thereon, when the bucket is in loaded position, and its release will permit the bucket to lower to dumping position.

FRANCIS TRENHOLM CROWE.

Witnesses:
SAMUEL R. WILSON,
GEO. N. CARTER.